(12) United States Patent
Stieg et al.

(10) Patent No.: US 11,268,697 B2
(45) Date of Patent: Mar. 8, 2022

(54) COMBUSTOR HEAT SHIELD SEALING

(71) Applicant: General Electric Company, Schenectady, NY (US)

(72) Inventors: Michael Alan Stieg, Cincinnati, OH (US); Valeria Proano Cadena, Cincinnati, OH (US); Aaron Michael Dziech, Dry Ridge, KY (US); Michael Todd Radwanski, Newport, KY (US); Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 16/537,836

(22) Filed: Aug. 12, 2019

(65) Prior Publication Data
US 2020/0003418 A1    Jan. 2, 2020

Related U.S. Application Data

(62) Division of application No. 15/409,635, filed on Jan. 19, 2017, now Pat. No. 10,378,772.

(51) Int. Cl.
| | | |
|---|---|---|
| *F23R 3/00* | (2006.01) | |
| *F23R 3/60* | (2006.01) | |
| *F23R 3/10* | (2006.01) | |

(52) U.S. Cl.
CPC .............. *F23R 3/007* (2013.01); *F23R 3/002* (2013.01); *F23R 3/10* (2013.01); *F23R 3/60* (2013.01); *F05D 2240/15* (2013.01); *F05D 2240/35* (2013.01); *F05D 2240/55* (2013.01);
(Continued)

(58) Field of Classification Search
CPC .................. F05D 2240/15; F23M 5/02; F23M 2900/05005; F23R 3/002; F23R 3/007; F23R 3/10; F23R 3/50; F23R 3/52; F23R 2900/00012
See application file for complete search history.

(56) References Cited

U.S. PATENT DOCUMENTS

| | | |
|---|---|---|
| 5,141,395 A | 8/1992 | Carroll et al. |
| 5,228,828 A | 7/1993 | Damlis et al. |
| 5,285,632 A | 2/1994 | Halila |
| (Continued) | | |

FOREIGN PATENT DOCUMENTS

| | | |
|---|---|---|
| FR | 2825778 A1 | 12/2002 |
| FR | 2935465 B1 | 3/2010 |

*Primary Examiner* — Scott J Walthour
(74) *Attorney, Agent, or Firm* — Dority & Manning, P.A.

(57) ABSTRACT

Combustor assemblies for gas turbine engines are provided. For example, a combustor assembly comprises a combustor dome, a first heat shield having an edge, a second heat shield having an edge, and a seal extending from the edge of the first heat shield to the edge of the second heat shield such that the seal spans a gap between the first heat shield and the second heat shield. In another embodiment, the seal has a first contact portion contacting the edge of the first heat shield, a second contact portion contacting the edge of the second heat shield edge, and a connecting portion connecting the first portion and the second portion. The first contact portion and the second contact portion project away from the connecting portion. Methods for sealing between adjacent heat shields of a combustor assembly also are provided.

10 Claims, 9 Drawing Sheets

(52) U.S. Cl.
CPC ............... *F23R 2900/00012* (2013.01); *F23R 2900/00018* (2013.01)

(56) References Cited

U.S. PATENT DOCUMENTS

| | | | |
|---|---|---|---|
| 5,333,443 A * | 8/1994 | Halila | F23R 3/60 |
| | | | 60/796 |
| 6,705,832 B2 * | 3/2004 | Tiemann | F01D 5/22 |
| | | | 277/630 |
| 6,726,448 B2 | 4/2004 | McGrath et al. | |
| 6,733,234 B2 | 5/2004 | Paprotna et al. | |
| 6,895,757 B2 | 5/2005 | Mitchell et al. | |
| 7,080,513 B2 | 7/2006 | Reichert | |
| 7,090,224 B2 | 8/2006 | Iguchi et al. | |
| 7,093,835 B2 | 8/2006 | Addis | |
| 7,316,402 B2 | 1/2008 | Paauwe | |
| 8,240,986 B1 | 8/2012 | Ebert | |
| 8,500,392 B2 | 8/2013 | Durocher et al. | |
| 8,756,935 B2 | 6/2014 | Duval et al. | |
| 8,763,406 B2 | 7/2014 | Pieussergues et al. | |
| 2003/0010038 A1 | 1/2003 | Maghon | |
| 2003/0012643 A1 * | 1/2003 | Tiemann | F01D 5/225 |
| | | | 415/170.1 |
| 2006/0255549 A1 | 11/2006 | Amos et al. | |
| 2007/0180828 A1 * | 8/2007 | Webb | F02K 9/64 |
| | | | 60/752 |
| 2011/0271684 A1 | 11/2011 | Corsmeier et al. | |

* cited by examiner

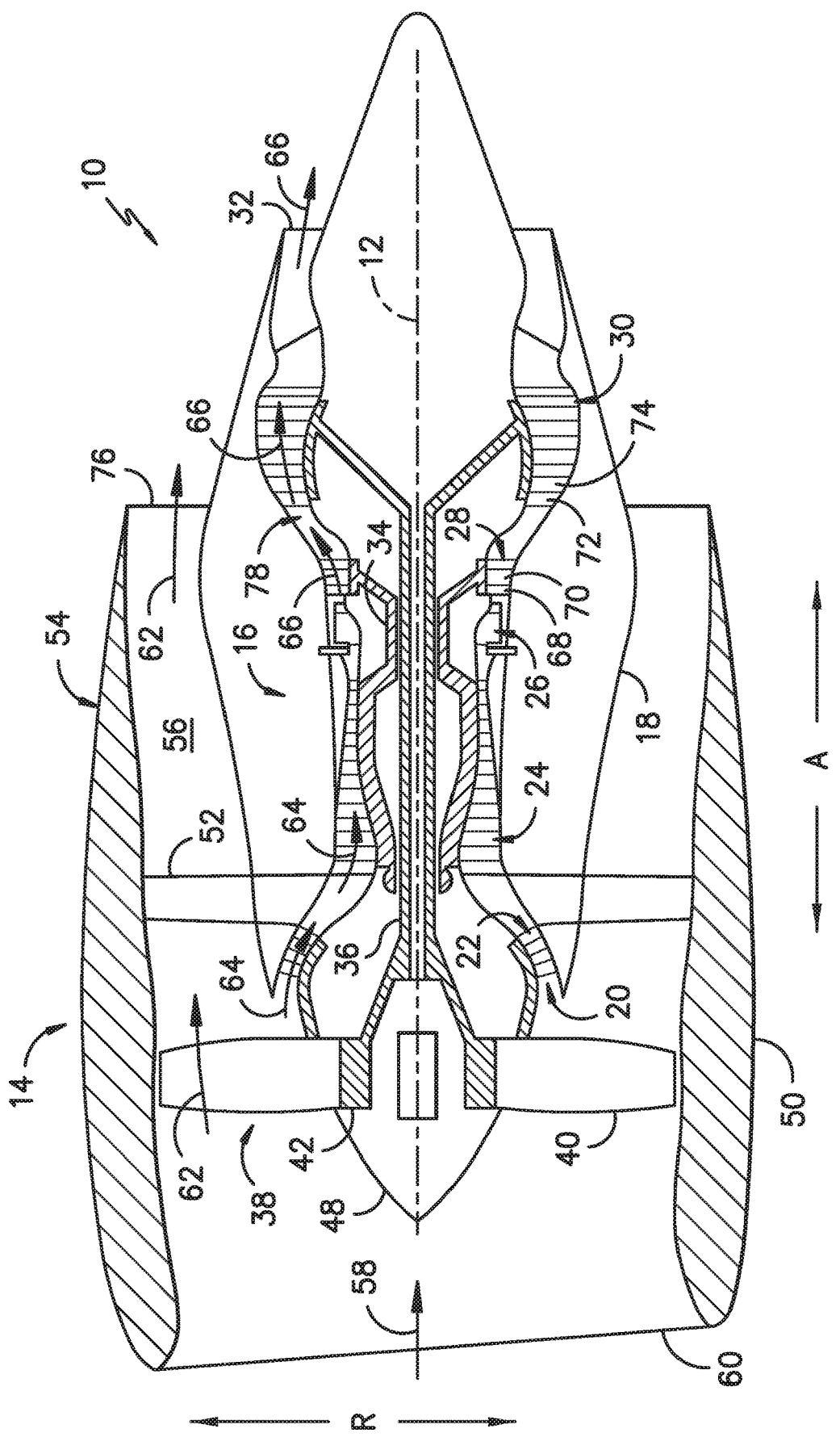
FIG. -1-

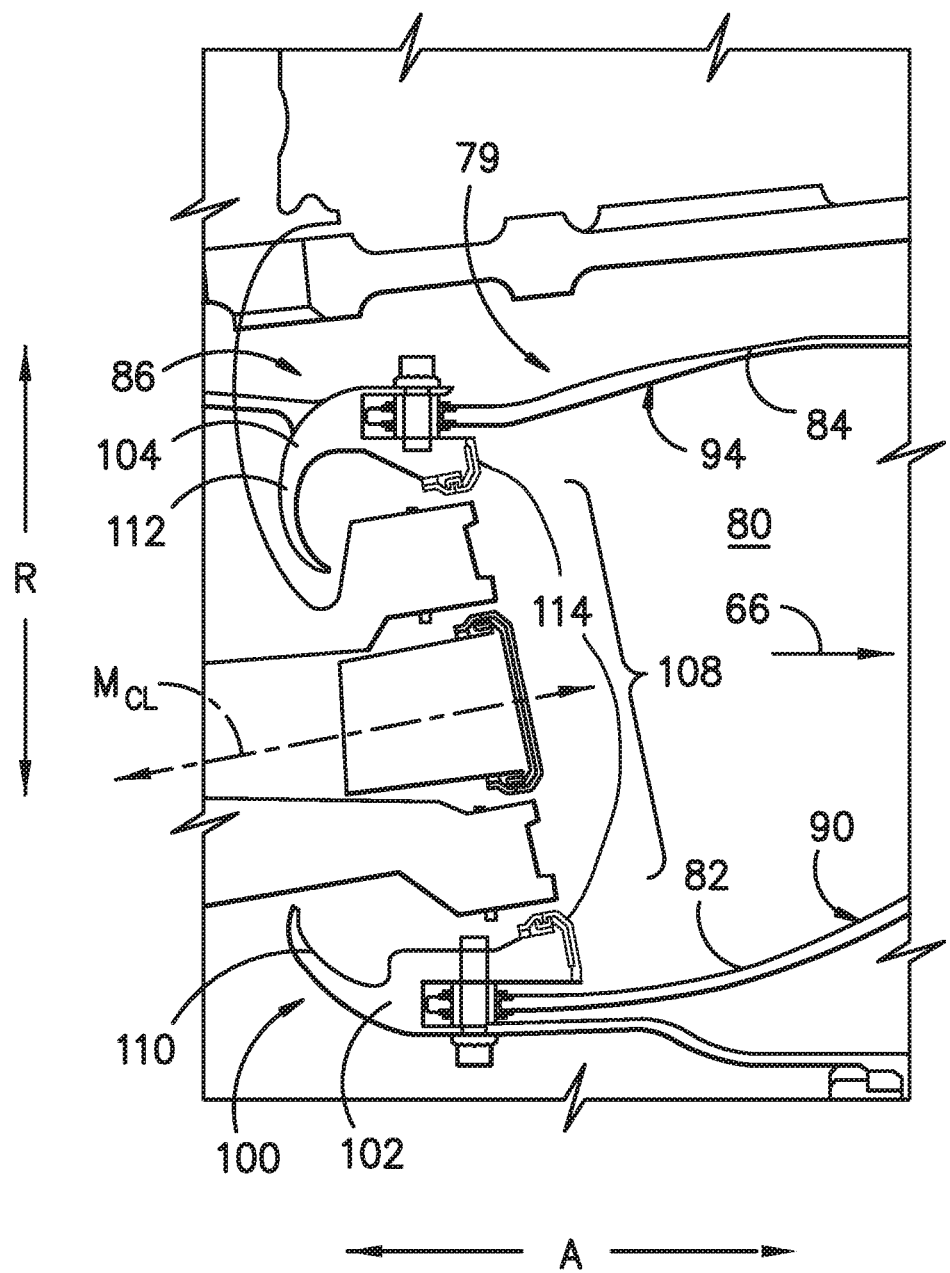
FIG. -2-

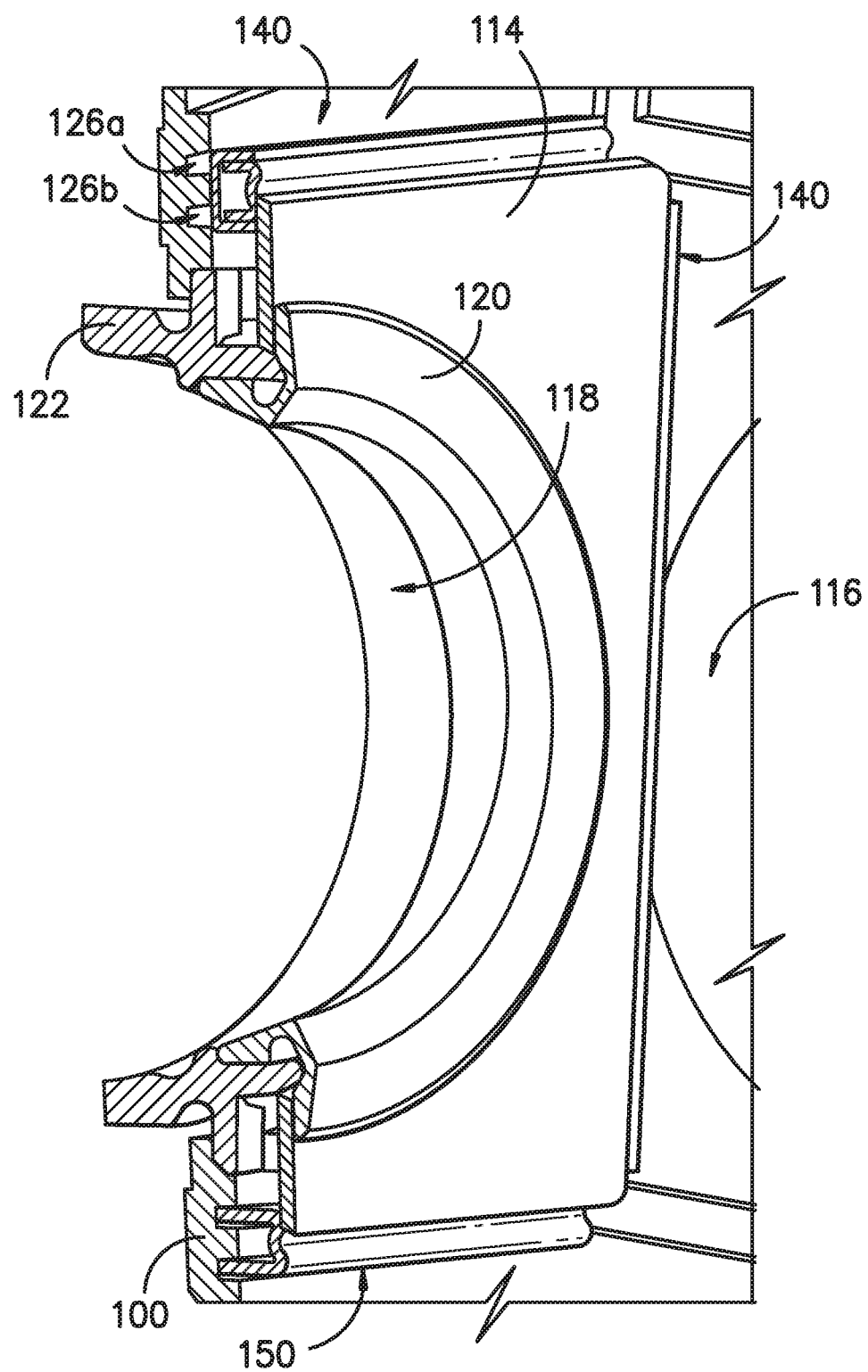
FIG. -3-

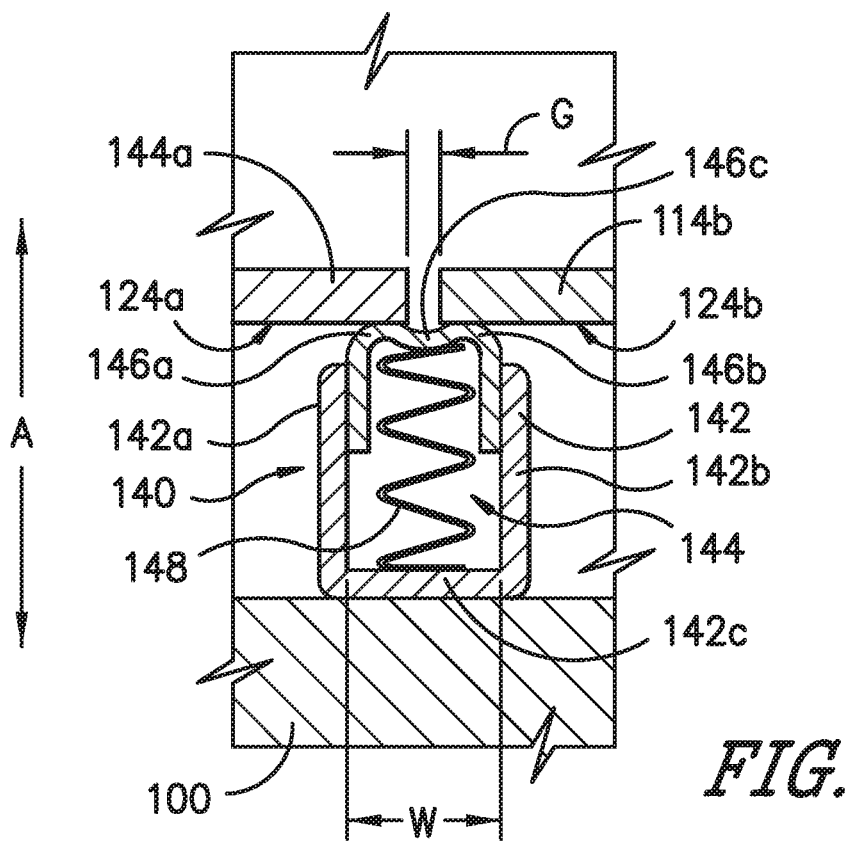
FIG. -4-
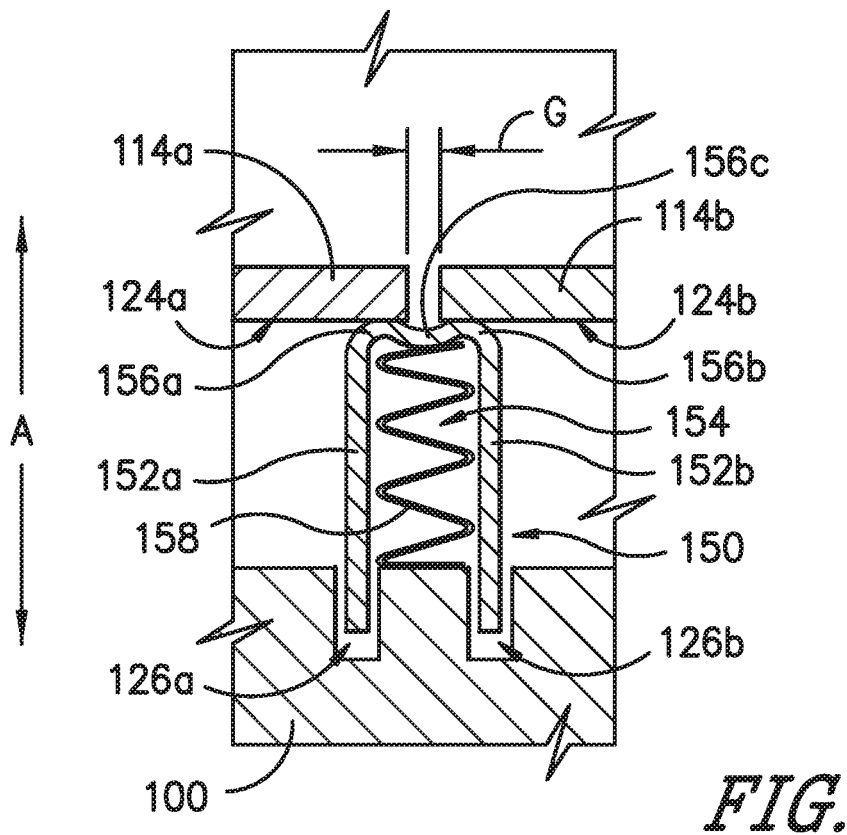
FIG. -5-

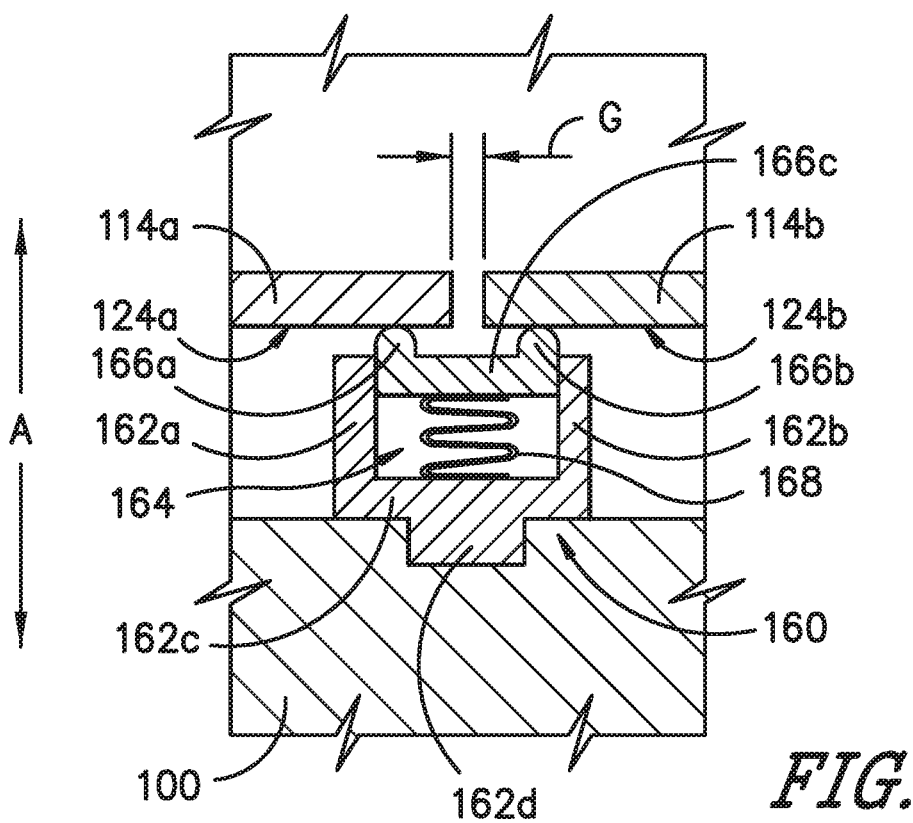
FIG. -6-
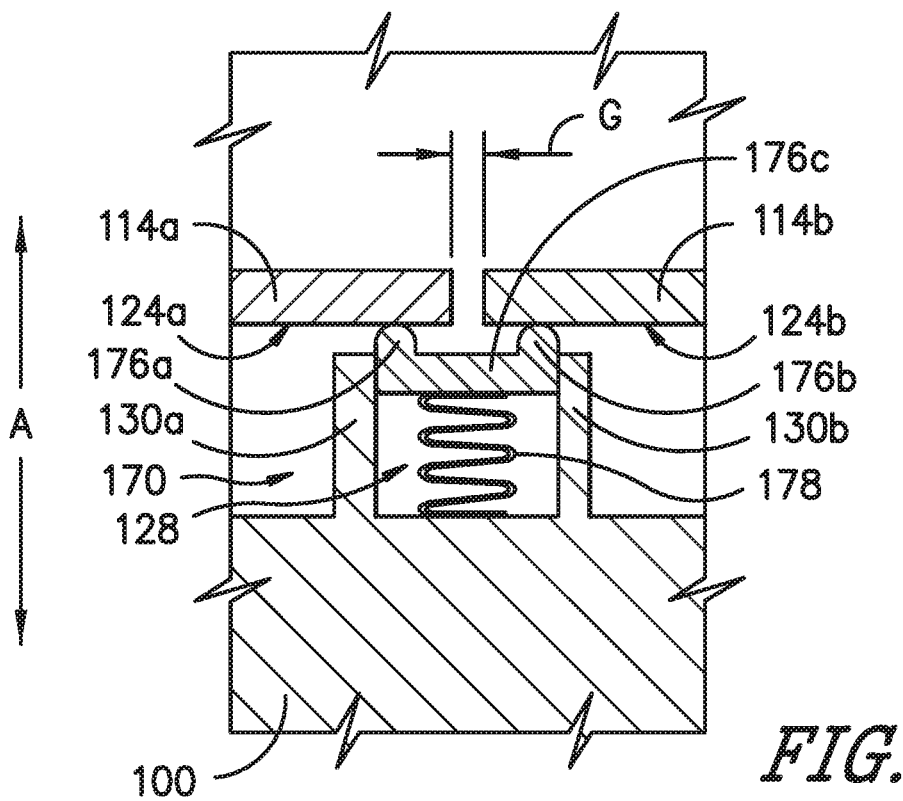
FIG. -7-

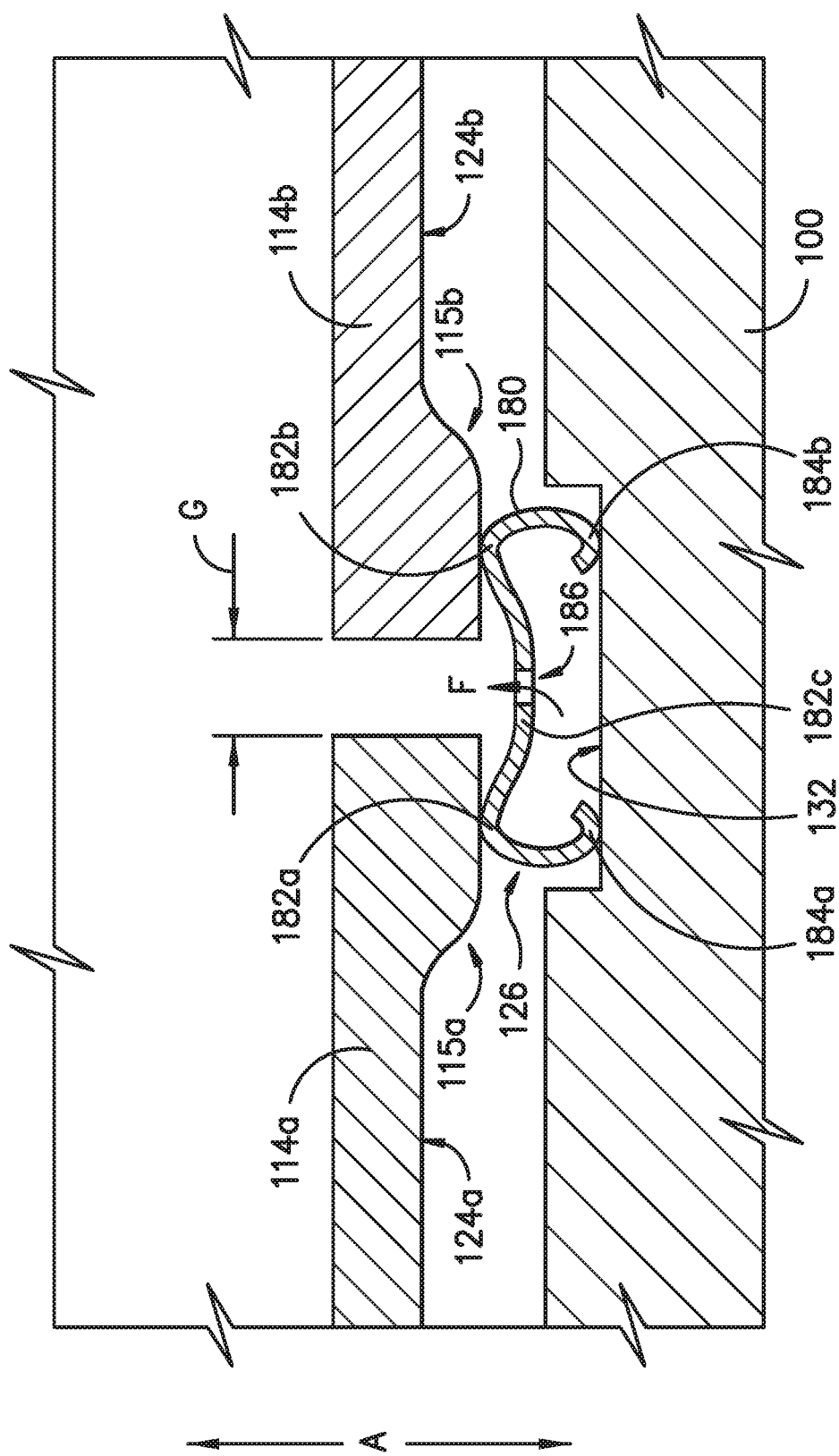

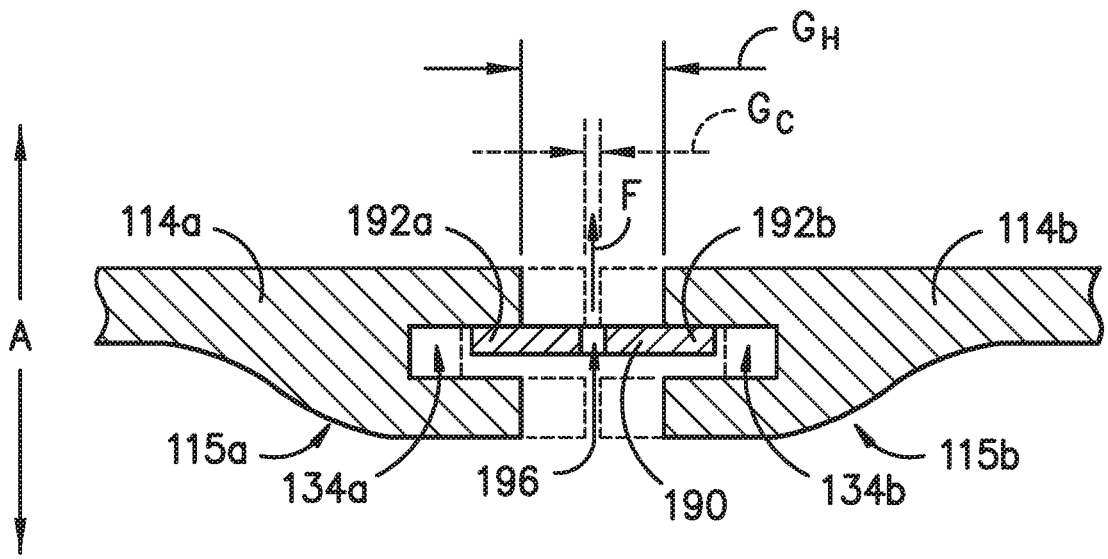
FIG. -9-
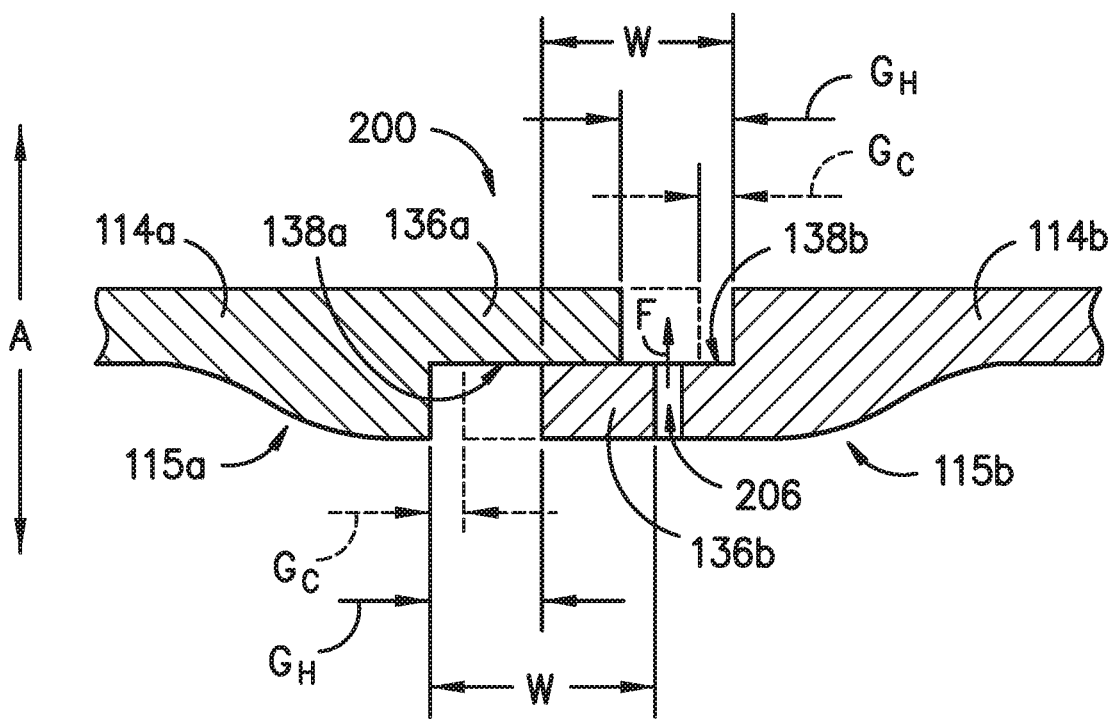
FIG. -10-

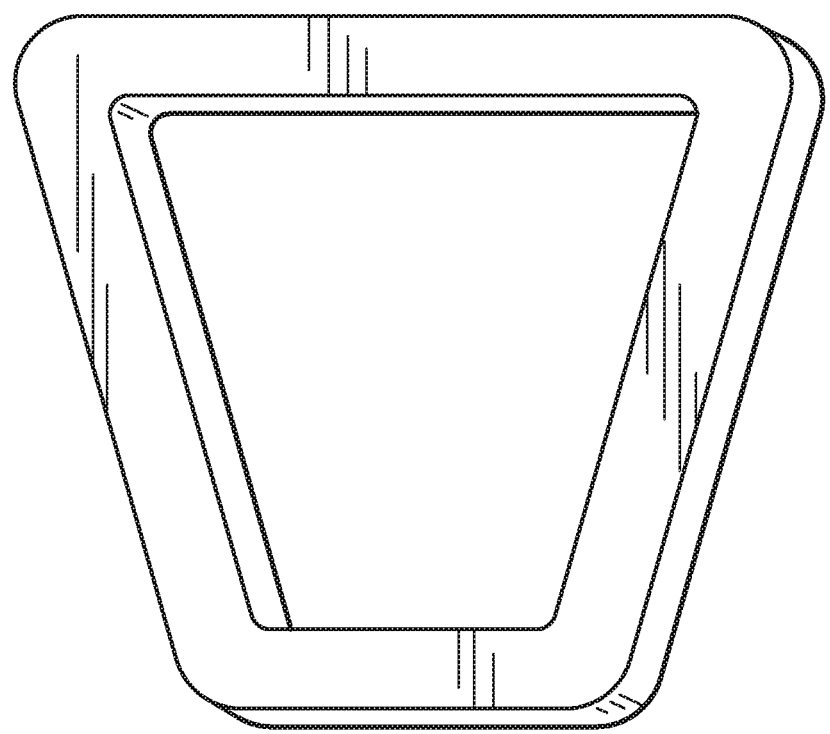
FIG. -11-

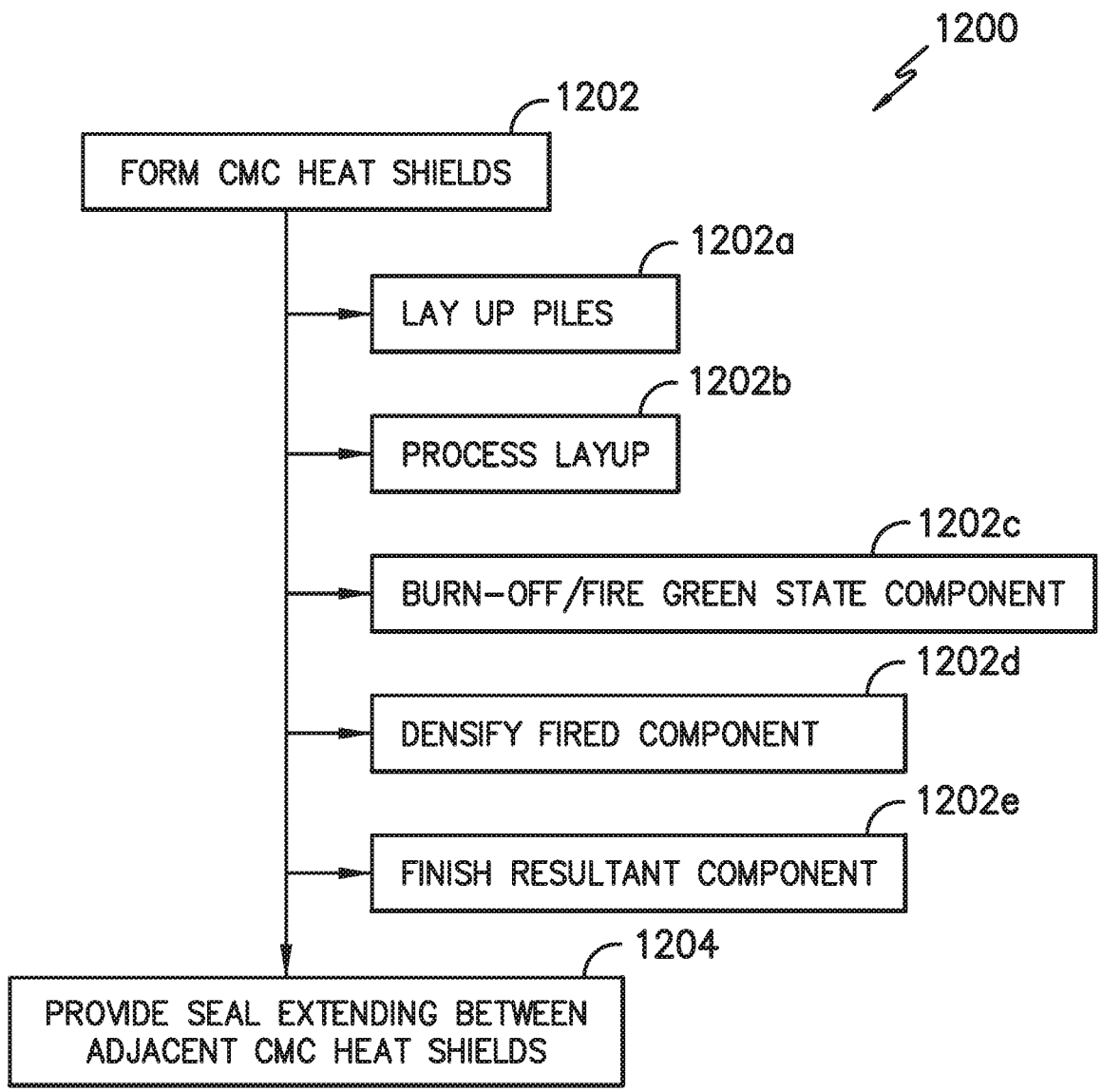
FIG. -12-

COMBUSTOR HEAT SHIELD SEALING

CROSS-REFERENCE TO RELATED APPLICATIONS

This application is a divisional of and claims priority to U.S. application Ser. No. 15/409,635, filed Jan. 19, 2017, the contents of which are incorporated herein by reference.

FIELD

The present subject matter relates generally to combustor assemblies of gas turbine engines. More particularly, the present subject matter relates to features for sealing an interface between a combustor heat shield and combustor dome.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Combustion gas temperatures are relatively hot, such that some components in or near the combustion section and the downstream turbine section require features for deflecting or mitigating the effects of the combustion gas temperatures. For example, one or more heat shields may be provided on a combustor dome to help protect the dome from the heat of the combustion gases. However, combustion gases can leak around the heat shields and impinge on the combustor dome, which can reduce an amount of working fluid for driving the turbine section as well as thermally damage the combustor dome. Moreover, the heat shields may be fabricated from a non-traditional high temperature material, such as a ceramic matrix composite (CMC) material, and the dome fabricated from a metallic material, such that there is a coefficient of thermal expansion (CTE) mismatch or different thermal growth between the components. As the metallic dome expands, the CTE mismatch can drive larger gap openings between CMC heat shield segments, e.g., compared to gap openings between metallic heat shields, and thereby encourage leakage as well as expose the dome.

In some typical combustor designs, a seal may be provided between a heat shield and the dome, but the dome can still be exposed in gaps between heat shields. Commonly, a flow of cooling fluid (i.e., purge flow) is directed against the dome in areas prone to leakage, such as gaps between heat shield segments, but diverting cooling flow to purge the leakage areas can negatively impact turbine emissions. Further, turbine performance and efficiency generally may be improved by increasing combustion gas temperatures. Therefore, there is an interest in providing heat shields formed from high temperature materials, such as CMC heat shields, that can withstand increased combustion gas temperatures yet also require less cooling, to increase turbine performance and efficiency while also reducing turbine emissions.

Accordingly, combustor heat shields and combustor assemblies that overcome one or more disadvantages of existing designs would be desirable. In particular, a combustor assembly utilizing CMC heat shields and seals that extend between adjacent CMC heat shields would be beneficial. Additionally, a combustor assembly that minimizes purge flow in an area of a combustor dome and heat shield interface would be useful. Further, a sealing mechanism that compensates for CTE mismatch between combustor heat shields and a combustor dome would be advantageous.

BRIEF DESCRIPTION

Aspects and advantages of the invention will be set forth in part in the following description, or may be obvious from the description, or may be learned through practice of the invention.

In one exemplary embodiment of the present disclosure, a combustor assembly for a gas turbine engine is provided. The combustor assembly comprises a combustor dome, a first heat shield having an edge, a second heat shield having an edge, and a seal extending from the edge of the first heat shield to the edge of the second heat shield such that the seal spans a gap between the first heat shield and the second heat shield.

In another exemplary embodiment of the present disclosure, a combustor assembly for a gas turbine engine is provided. The combustor assembly comprises a combustor dome, a first heat shield having an edge, a second heat shield having an edge, and a seal extending from the edge of the first heat shield to the edge of the second heat shield. The seal has a first contact portion contacting the edge of the first heat shield, a second contact portion contacting the edge of the second heat shield edge, and a connecting portion connecting the first portion and the second portion. The first contact portion and the second contact portion project away from the connecting portion.

In a further exemplary embodiment of the present disclosure, a method for sealing between adjacent heat shields of a combustor assembly is provided. The method comprises providing a seal that extends from one heat shield to an adjacent heat shield such that the seal spans a gap between the one heat shield and the adjacent heat shield. Each heat shield is formed from a ceramic matrix composite (CMC) material such that each heat shield is a CMC heat shield.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 1 provides a schematic cross-section view of an exemplary gas turbine engine according to various embodiments of the present subject matter.

FIG. 2 provides a schematic cross-section view of a combustor assembly according to an exemplary embodiment of the present subject matter.

FIG. 3 provides an aft perspective view of a portion of a heat shield assembled with a combustor dome, according to an exemplary embodiment of the present subject matter.

FIGS. 4, 5, 6, 7, and 8 each provide a cross-sectional view of a seal extending between adjacent heat shields and the combustor dome, according to exemplary embodiments of the present subject matter.

FIG. 9 provides a cross-sectional view of a seal extending between adjacent heat shields according to an exemplary embodiment of the present subject matter.

FIG. 10 provides a cross-sectional view of a seal formed by overlapping edges of adjacent heat shields according to an exemplary embodiment of the present subject matter.

FIG. 11 provides a top, perspective view of a seal extending generally in the shape of a heat shield perimeter.

FIG. 12 provides a chart illustrating a method for sealing between adjacent heat shields of a combustor assembly according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Referring now to FIG. 2, a schematic, cross-sectional view is provided of a combustor assembly 79 according to an exemplary embodiment of the present subject matter. More particularly, FIG. 2 provides a side, cross-sectional view of an exemplary combustor assembly 79, which may, for example, be positioned in the combustion section 26 of the exemplary turbofan engine 12 of FIG. 1.

Combustor assembly 79 depicted in FIG. 2 generally includes a combustion chamber 80 defined by an inner liner 82 and an outer liner 84, e.g., combustion liners 82, 84 together at least partially define combustion chamber 80 therebetween. Combustion liners 82, 84, or other components of combustor assembly 79, may be made from a ceramic matrix composite (CMC) material as further described below. Combustor assembly 79 extends generally along the axial direction A from a forward end 86 to an aft end (not shown). The inner liner 82 and outer liner 84 are attached to an annular combustor dome 100 at the forward end 86 of combustor assembly 79. More particularly, dome 100 includes an inner dome section 102 attached to inner liner 82 and an outer dome section 104 attached to outer liner 84. The inner and outer dome sections 102, 104 may each extend along a circumferential direction C (FIG. 3) to define an annular shape. The inner and outer dome sections 102, 104 may be portions of a single piece combustor dome 100, or in other embodiments, the inner and outer dome sections 102, 104 may be separate pieces that together make up combustor dome 100. Other configurations of the combustor dome 100 also may be used.

Combustor assembly 79 further includes a plurality of fuel air mixers 108 spaced along the circumferential direction and positioned at least partially within the dome 100. More particularly, the plurality of fuel air mixers 108 are disposed at least partially between outer dome section 104 and inner dome section 102 along the radial direction R, and each fuel air mixer 108 defines a centerline $M_{CL}$. Compressed air from the compressor section of the turbofan engine 10 flows into or through the fuel air mixers 108, where the compressed air is mixed with fuel and ignited to create the combustion gases 66 within the combustion chamber 80. The inner and outer dome sections 102, 104 are configured to assist in providing the flow of compressed air from the compressor section into or through the fuel air mixers 108. For example, inner dome section 102 includes an inner cowl 110, and outer dome section 104 similarly includes an outer cowl 112. The inner and outer cowls 110, 112 may assist in directing the flow of compressed air from the compressor section into or through one or more of the fuel air mixers 108. Similar to the inner and outer dome sections 102, 104, the inner and outer cowls 110, 112 may be portions of a single piece combustor dome 100, or each of the inner dome section 102, outer dome section 104, inner cowl 110, and outer cowl 112 may be a separate piece that together form combustor dome 100. In other embodiments, the inner cowl 110 may be integrated with the inner dome section 102 to form an inner dome piece and the outer cowl 112 may be integrated with the outer dome section 104 to form an outer dome piece, and together the inner dome piece and the outer dome piece make up the combustor dome 100. However, the various embodiments are provided by way of example only, and the combustor dome 100 also may have other configurations.

Referring still to FIG. 2, the exemplary combustor assembly 79 further includes a heat shield 114 positioned around the depicted fuel air mixer 108. The exemplary heat shield 114, for the depicted embodiment, is attached to and extends between inner and outer dome sections 102, 104. The heat shield 114 is configured to protect certain components of the turbofan engine 10 from the relatively extreme temperatures of the combustion chamber 80. The combustor assembly 79 may include one or more heat shields 114, e.g, a heat shield 114 may be provided at each of the plurality of fuel air mixers 108 such that the combustor assembly 79 includes a plurality of separate heat shields 114.

In some embodiments, components of turbofan engine 10, particularly components within hot gas path 78 such as components of combustion assembly 79, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. However, CMC components may be used in other sections as well, such as the compressor and/or fan sections. As a particular example described in greater detail below, heat shield 114 for combustor dome 100 may be formed from a CMC material to provide protection to the dome from the heat of the combustion gases, e.g., while reducing or eliminating cooling from a flow of fluid as is usually required for metal heat shields.

Turning now to FIG. 3, a partial perspective, cross-section view is provided of the combustor dome 100 and a heat shield 114 according to an exemplary embodiment of the present subject matter. As previously stated, the combustor assembly 79 may include a plurality of separate heat shields 114, which may be positioned adjacent to one another to shield the combustor dome 100 from the combustion gases. As illustrated in FIG. 3, one heat shield 114 is positioned at an aperture 116 defined in the combustor dome 100 for receipt of a fuel air mixer 108. The heat shield 114 defines a heat shield aperture 118 that aligns with the aperture 116 such that a fuel air mixer 108 may extend through the aperture 116, through the heat shield aperture 118, and into the combustion chamber 80. To the right of the depicted heat shield 114 positioned at aperture 116, a second heat shield 114 can be positioned at the second aperture 116 defined in the dome 100. The second heat shield 114 has be omitted from FIG. 3 for clarity, but it will be appreciated that a heat shield 114 may be positioned at each aperture 116 defined in the combustor dome 100. In other embodiments, the heat shields 114 may be segmented in other ways, e.g., one heat shield 114 may be provided at every two apertures 116 such that the heat shield 114 defines two heat shield apertures 118, each heat shield aperture 118 aligning with an aperture 116 defined in the combustor dome 100.

In the embodiment shown in FIG. 3, a collar 120 and an attachment piece 122 couple the heat shield 114 to the combustor dome 100. A collar 120 and an attachment piece 122 may be provided at each heat shield aperture 118. As illustrated in FIG. 3, the collar 120 and attachment piece 122 may extend axially between a surface of the heat shield 114 defining the heat shield aperture 118 and a surface of the dome 100 defining the aperture 116 such that substantially no combustion gas leaks between the heat shield 114 and combustor dome 100 at the apertures 116, 118.

The combustor assembly 79 includes other features for preventing or reducing combustion gas leakage between the heat shields 114 and combustor dome 100. FIG. 3 depicts a seal 140, according to an exemplary embodiment of the present subject matter, extending along two of the three edges of the heat shield 114 that are shown in FIG. 3. FIG. 3 also depicts a seal 150, according to an exemplary embodiment of the present subject matter, extending along the other of the three edges of the heat shield 114 shown in FIG. 3. The seals 140 and seal 150 are disposed between the heat shield 114 and the combustor dome 100. As described in greater detail herein, each seal 140, 150 is configured to minimize combustion gas leakage between the heat shield 114 and combustor dome 100, as well as minimize combustion gas impingement on the combustor dome 100.

Referring now to FIG. 4, the exemplary seal 140 is illustrated in greater detail. The seal 140 includes a housing 142 having side walls 142a, 142b projecting from an end wall 142c. The housing 142 defines a channel 144 between its walls 142a, 142b, 142c, and a plunger 146 is positioned within the channel 114. More particularly, the plunger 146 extends between the side walls 142a, 142b along a width W of the channel 144; thus, the plunger 146 has a width W the same as the width of the channel 144. The plunger 146 also extends along a length of the channel 144 (not shown) such that the plunger 146 has the same length as the channel 144. A spring or spring-like material 148 extends from the end wall 142c of the housing 142 to the plunger 146. The spring or spring-like material 148 will be referred to herein generally as "spring 148." The end wall 142 contacts the combustor dome 100 and the spring 148 urges the plunger 146 into contact with a first heat shield 114a and a second heat shield 114b.

As illustrated in FIG. 4, the plunger 146 defines a first contact portion 146a and a second contact portion 146b. The first contact portion 146a is generally rounded and contacts a forward surface 124a of the first heat shield 114a. The second contact portion 146b is generally rounded and contacts a forward surface 124b of the second heat shield 114b. As such, the seal 140 extends from an edge of the first heat shield 114a to an edge of the second heat shield 114b, which is adjacent to the first heat shield 114a, and thereby spans a gap G between the first heat shield 114a and the second heat shield 114b. It will be appreciated that, in embodiments of combustor assembly 79 comprising a plurality of heat shields 114, a plurality of seals 140 may be provided, e.g., along the edges of the plurality of heat shields 114 as illustrated in FIG. 4.

A connecting portion 146c of the plunger 146 connects the first contact portion 146a and the second contact portion 146b. As shown in FIG. 4, the first and second contact portions 146a, 146b project away from the connecting portion 146c; the contact portions 146a, 146b may be described as peaks and the connection portion 146c may be described as a valley. Further, the connecting portion 146c is in contact with the spring 148. As such, it will be appreciated that the plunger 146 may rotate about the spring 148 with any shifting of heat shields 114a, 114b along the axial direction A and maintain contact with each of heat shields 114a, 114b. That is, the rounded, peaked shape of contact portions 146a, 146b helps the contact portions 146a, 146b maintain contact with their respective heat shield 114a, 114b even if one or both of the heat shields 114a, 114b moves along the axial direction, and the spring 148 may expand or contract to keep the plunger 146 in contact with the heat shields 114a, 114b. Additionally, the width W of the plunger 146 helps the plunger 146 remain in contact with the heat shields 114a, 114b if the gap G defined between the heat shields 114a, 114b expands or contracts as the heat shields move away or toward one another as described in greater detail below. By maintaining contact between the heat shields 114a, 114b and the plunger 146, the seal 140 continuously extends between the heat shields 114a, 114b and combustor dome 100 and thereby helps prevent or reduce combustion gas leakage between the heat shields 114a, 114b and combustor dome 100.

The seal between the heat shields 114 and combustor dome 100 may have other configurations as well. As shown in FIGS. 3 and 5, in some embodiments, one or more grooves 126, such as a first groove 126a and a second groove 126b, may be defined in the combustor dome 100. FIG. 5 illustrates in greater detail the seal 150 shown in FIG. 3. As depicted in FIG. 5, a portion of the seal 150 fits within the grooves 126 of combustor dome 100 and extends between one or more heat shields 114 and the combustor dome 100 to minimize the leakage of combustion gases between the heat shield(s) and combustor dome. Similar to seal 140, the seal 150 includes a plunger 156 and a spring or spring-like material 158, generally referred to herein as "spring 158." The spring 158 extends from the combustor dome 100 to the plunger 156.

The plunger 156 defines a first contact portion 156a and a second contact portion 156b. The first contact portion 156a is generally rounded and contacts the forward surface 124a of the first heat shield 114a. The second contact portion 156b is generally rounded and contacts the forward surface 124b of the second heat shield 114b. As such, the seal 150 extends from an edge of the first heat shield 114a to an edge of the second heat shield 114b, which is adjacent to the first heat shield 114a, and thereby spans a gap G between the first heat shield 114a and the second heat shield 114b. Further, the spring 158 urges the contact portions 156a, 156b into contact with the respective heat shields 114a, 114b. It will be appreciated that, in embodiments of combustor assembly 79 comprising a plurality of heat shields 114, a plurality of seals 150 may be provided, e.g., along the edges of the plurality of heat shields 114 as illustrated in FIG. 5.

Moreover, the plunger 156 includes a connecting portion 156c that connects the first contact portion 156a and the second contact portion 156b. The first and second contact portions 156a, 156b project away from the connecting portion 146c; the contact portions 156a, 156b may be described as peaks and the connection portion 156c may be described as a valley. Further, the connecting portion 156c is in contact with the spring 158. As such, it will be appreciated that the plunger 156 may rotate about the spring 158 with any shifting of heat shields 114a, 114b along the axial direction A and maintain contact with each of heat shields 114a, 114b. That is, the rounded, peaked shape of contact portions 156a, 156b helps the contact portions 156a, 156b maintain contact with their respective heat shield 114a, 114b even if one or both of the heat shields 114a, 114b moves along the axial direction, and the spring 158 may expand or contract to keep the plunger 156 in contact with the heat shields 114a, 114b.

Additionally, the plunger 156 includes legs 152, e.g., a first leg 152a and a second leg 152b, and each leg 152 is received within a respective groove 126 of the combustor dome 100. For instance, the first leg 152a is received within the first groove 126a and the second leg 152b is received within the second groove 126b. As shown in FIG. 5, the legs 152 can move within grooves 126 to accommodate shifting of the heat shields 114 as described above, e.g., one or both legs 152 may move deeper within the respective groove 126 if one or both of heat shields 114a, 114b shifts forward along the axial direction A. Further, a channel 144 is defined between the legs 152 of the plunger 156, and the spring 158 is positioned within the channel. Further, the legs 152 define a width W of the plunger 156. Similar to seal 140, the width W of plunger 156 of seal 150 also helps the plunger 156 remain in contact with the heat shields 114a, 114b if the gap G defined between the heat shields 114a, 114b expands or contracts as the heat shields move away or toward one another as described in greater detail below. By maintaining contact between the heat shields 114a, 114b and the plunger 156, the seal 150 continuously extends between the heat shields 114a, 114b and combustor dome 100 and thereby helps prevent or reduce combustion gas leakage between the heat shields 114a, 114b and combustor dome 100.

Referring now to FIG. 6, a cross-sectional view is provided of a seal 160 extending between adjacent heat shields 114 and the combustor dome 100 according to an exemplary embodiment of the present subject matter. Seal 160 has some similarities to previously described seals 140, 150. More particularly, seal 160 includes a housing 162 that has side walls 162a, 162b, and an end wall 162c; the side walls 162a, 162b project from the end wall 162c. Further, the end wall 162c contacts the combustor dome 100 and defines a projection 162d that is received with a groove 126 defined in the combustor dome 100.

The housing 162 defines a channel 164 between its walls 162a, 162b, 162c, and a plunger 166 is positioned within the channel 164. More specifically, the plunger 166 extends between the side walls 162a, 162b along a width W of the channel 164; thus, the plunger 166 has a width W the same as the width of the channel 164. The plunger 166 also extends along a length of the channel 164 (not shown) such that the plunger 166 has the same length as the channel 164. As shown in FIG. 6, the plunger 166 has a generally dog bone-shaped cross-section. A spring or spring-like material 168, referred to herein generally as "spring 168," extends from the end wall 162c of the housing 162 to the plunger 166. The spring 168 urges the plunger 166 into contact with a first heat shield 114a and a second heat shield 114b.

The plunger 166 defines a first contact portion 166a and a second contact portion 166b. The first contact portion 166a is generally rounded and contacts the forward surface 124a of the first heat shield 114a. The second contact portion 166b is generally rounded and contacts the forward surface 124b of the second heat shield 114b. As such, the seal 160 extends from an edge of the first heat shield 114a to an edge of the second heat shield 114b, which is adjacent to the first heat shield 114a, and thereby spans a gap G between the first heat shield 114a and the second heat shield 114b. In embodiments of combustor assembly 79 comprising a plurality of heat shields 114, a plurality of seals 160 may be provided, e.g., along the edges of the plurality of heat shields 114 as illustrated in FIG. 6.

The plunger 166 also includes a connecting portion 166c that connects the first contact portion 166a and the second contact portion 166b. The first and second contact portions 166a, 166b project away from the connecting portion 166c; the contact portions 166a, 166b may be described as peaks and the connection portion 166c may be described as a valley. Further, the connecting portion 166c is in contact with the spring 168. As such, it will be appreciated that the plunger 166 may rotate about the spring 168 with any shifting of heat shields 114a, 114b along the axial direction A and maintain contact with each of heat shields 114a, 114b. That is, the rounded, peaked shape of contact portions 166a, 166b helps the contact portions 166a, 166b maintain contact with their respective heat shield 114a, 114b even if one or both of the heat shields 114a, 114b moves along the axial direction, and the spring 168 may expand or contract to keep the plunger 166 in contact with the heat shields 114a, 114b. Additionally, the width W of the plunger 166 helps the plunger 166 remain in contact with the heat shields 114a, 114b if the gap G defined between the heat shields 114a, 114b expands or contracts as the heat shields move away or toward one another as described in greater detail below. By maintaining contact between the heat shields 114a, 114b and the plunger 166, the seal 160 continuously extends between the heat shields 114a, 114b and combustor dome 100 and thereby helps prevent or reduce combustion gas leakage between the heat shields 114a, 114b and combustor dome 100.

FIG. 7 provides a cross-sectional view is provided of a seal 170 extending between adjacent heat shields 114 and the combustor dome 100 according to an exemplary embodiment of the present subject matter. Seal 170 has some similarities to previously described seals 140, 150, 160. In particular, seal 170 is similar to seal 160 without a separate housing; rather, the combustor dome 100 defines a channel 128 in which a plunger 176 and a spring 178 of the seal 170 are positioned. More particularly, in the exemplary embodiment of FIG. 7, the combustor dome 100 includes a first side wall 130a and a second side wall 130b that define the channel 128. In other embodiments, the channel 128 may be defined in the combustor dome 100 similar to grooves 126 shown in FIGS. 5 and 6, i.e., such that side walls 130a, 130b are omitted.

The plunger 176 extends between the side walls 130a, 130b along a width W of the channel 128; thus, the plunger 176 has a width W the same as the width of the channel 128. The plunger 176 also extends along a length of the channel 128 (not shown) such that the plunger 176 has the same length as the channel 128. Further, similar to the plunger 166 of the seal 160, as shown in FIG. 7, the plunger 176 has a generally dog bone-shaped cross-section. The spring or spring-like material 178, referred to herein generally as "spring 178," extends within the channel 128 from the combustor dome 100 to the plunger 176. The spring 178 urges the plunger 176 into contact with a first heat shield 114a and a second heat shield 114b.

The plunger 176 defines a first contact portion 176a and a second contact portion 176b. The first contact portion 176a is generally rounded and contacts the forward surface 124a of the first heat shield 114a. The second contact portion 176b is generally rounded and contacts the forward surface 124b of the second heat shield 114b. As such, the seal 170 extends from an edge of the first heat shield 114a to an edge of the second heat shield 114b, which is adjacent to the first heat shield 114a, and thereby spans a gap G between the first heat shield 114a and the second heat shield 114b. It will be appreciated that, in embodiments of combustor assembly 79 comprising a plurality of heat shields 114, a plurality of seals 170 may be provided, e.g., along the edges of the plurality of heat shields 114 as illustrated in FIG. 7.

The plunger 176 also includes a connecting portion 176c that connects the first contact portion 176a and the second contact portion 176b. The first and second contact portions 176a, 176b project away from the connecting portion 176c; the contact portions 176a, 176b may be described as peaks and the connection portion 176c may be described as a valley. Further, the connecting portion 176c is in contact with the spring 178. As such, it will be appreciated that the plunger 176 may rotate about the spring 178 with any shifting of heat shields 114a, 114b along the axial direction A and maintain contact with each of heat shields 114a, 114b. That is, the rounded, peaked shape of contact portions 176a, 176b helps the contact portions 176a, 176b maintain contact with their respective heat shield 114a, 114b even if one or both of the heat shields 114a, 114b moves along the axial direction, and the spring 178 may expand or contract to keep the plunger 176 in contact with the heat shields 114a, 114b. Moreover, the width W of the plunger 176 helps the plunger 176 remain in contact with the heat shields 114a, 114b if the gap G defined between the heat shields 114a, 114b expands or contracts as the heat shields move away or toward one another as described in greater detail below. By maintaining contact between the heat shields 114a, 114b and the plunger 176, the seal 170 continuously extends between the heat shields 114a, 114b and combustor dome 100 and thereby helps prevent or reduce combustion gas leakage between the heat shields 114a, 114b and combustor dome 100.

As described, keeping the plungers of the seals 140, 150, 160, 170 in contact with the heat shields 114 helps prevent or reduce paths for combustion gas leakage between the heat shields 114 and the combustor dome 100. Further, the exemplary seals 140, 150, 160, 170 each maintain contact with adjacent heat shields 114, e.g., along the adjacent edges of the heat shields. As such, the seals described above with respect to FIGS. 4 through 7 provide a barrier between the combustion chamber 80 and the combustor dome 100 and thereby help prevent impingement of combustion gases on the combustor dome 100, e.g., through gaps G between the adjacent heat shields 114. Further, in some embodiments, one or more purge apertures may be defined through the plungers of seals 140, 150, 160, 170. The purge apertures may be defined along a length of the plunger to allow a flow of cooling fluid from between the heat shields 114 and the combustor dome 100 to flow through the seal 140, 150, 160, 170, which helps cool the seal as well as the heat shields 114 and combustor dome 100. In some embodiments, the engine temperatures may be low enough that purge flow through the seals is not required, and in other embodiments, the combustor may experience higher temperatures in some areas of the combustor than in other areas of the combustor, such that the seals within the higher temperature areas may define purge apertures while the seals in other areas of the combustor do not define purge apertures, i.e., the purge flow through the seals is provided only in limited areas of the combustor. Purge flow through heat shield seals is described in greater detail below with respect to the embodiment shown in FIG. 8.

Turning now to FIG. 8, a cross-sectional view is provided of a seal 180 extending between adjacent heat shields 114 and the combustor dome 100 according to an exemplary embodiment of the present subject matter. The seal 180 has some differences from the above-described seals 140, 150, 160, 170, but also utilizes some similar features. For example, as shown in FIG. 8, the seal 180 includes a first contact portion 182a that is generally rounded and contacts the forward surface 124a of the first heat shield 114a, as well as a second contact portion 182b is generally rounded and contacts the forward surface 124b of the second heat shield 114b. The seal 180 also includes a connecting portion 182c that connects the first contact portion 182a and the second contact portion 182b. The first and second contact portions 182a, 182b project away from the connecting portion 182c; the contact portions 182a, 182b may be described as peaks and the connecting portion 182c may be described as a valley. As such, it will be appreciated that, with any shifting of heat shields 114a, 114b along the axial direction A and maintain contact with each of heat shields 114a, 114b. That is, the rounded, peaked shape of contact portions 182a, 182b helps the contact portions 182a, 182b maintain contact with their respective heat shield 114a, 114b even if one or both of the heat shields 114a, 114b moves along the axial direction. Moreover, the seal 180 has a width W that helps the seal 180 remain in contact with the heat shields 114a, 114b if a gap G defined between the heat shields 114a, 114b expands or contracts as the heat shields move away or toward one another as described in greater detail below. By adapting to movement or shifting of the heat shields 114, the seal 180 continuously extends between the heat shields 114a, 114b and combustor dome 100 and thereby helps prevent or reduce combustion gas leakage between the heat shields 114a, 114b and combustor dome 100.

As further depicted in FIG. 8, the seal 180 is positioned within a groove 126 defined in the combustor dome 100. The first contact portion 182a is in contact with an edge 115a of the first heat shield 114a, and the second contact portion 182b is in contact with an edge 115b of the second heat shield 114b such that the seal 180 extends from the edge of one heat shield to the edge of an adjacent heat shield and thereby spans the gap G between the first heat shield 114a and the second heat shield 114b. It will be appreciated that, in embodiments of combustor assembly 79 comprising a plurality of heat shields 114, a plurality of seals 180 may be provided, e.g., at the edges of the plurality of heat shields 114. Further, as illustrated in FIG. 8, the edges 115a, 115b are built up, i.e., thicker than other portions of the heat shields 114. By building up the edges 115a, 115b, the edges have additional material for machining, e.g., such that the edges may be machined to increase the precision of the interface between the heat shields 114 and the seal 180 without reducing the thickness of the body of the heat shield. As further described herein, the heat shields 114 may be made from a CMC material, such that the edge buildup of a heat shield 114 may comprise additional CMC plies that are feathered in with the CMC plies forming the heat shield 114 to provide machine stock for machining the interface between the seal 180 and the heat shield 114.

Opposite each heat shield contact portion 182a, 182b, the seal 180 includes a combustor dome contact portion 184a, 184b. The first contact portion 184a is generally rounded and contacts a surface 132 of the combustor dome 100 defining groove 126, and the second contact portion 184b is generally rounded and contacts the surface 132. Thus, as shown in FIG. 8, the seal 180 generally curves from the first heat shield contact portion 182a to the first combustor dome contact portion 184a and from the second heat shield contact portion 182b to the second combustor dome contact portion 184b. As previously described with respect to the first and second contact portions 182a, 182b, the shape and configuration of the first and second contact portions 184a, 184b helps the contact portions 184a, 184b maintain contact with the combustor dome 100 even if the heat shields 114a, 114b shift with respect to one another and/or with respect to the combustor dome 100. Further, in some embodiments, the seal 180 may be compressible to absorb changes in position between the heat shields 114a, 114b and the combustor dome 100. Accordingly, the seal between the heat shields 114a, 114b and combustor dome 100 may be maintained to help prevent combustion gas leakage between the heat shields and the combustor dome. Moreover, the extension of the seal 180 from the edge of one heat shield 114 to the edge of an adjacent heat shield 114 helps prevent impingement of the combustion gases on the combustor dome 100; the combustion gases impinge on the seal 180 rather than the combustor dome 100.

As further illustrated in FIG. 8, in some embodiments, the seal 180 defines a purge aperture 186 through the seal. The purge aperture 186 may allow a flow F of cooling fluid from between the heat shields 114 and the combustor dome 100 to flow through the seal 180. The flow F of cooling fluid through the seal 180 helps cool the seal 180, as well as the heat shields 114 and combustor dome 100. It will be appreciated that a plurality of purge apertures 186 may be provided along the length of seal 180. Further, the purge apertures 186 may not be required for each embodiment of the seal 180. For example, in some embodiments, the engine temperatures may be low enough that purge flow through the seals 180 is not required. In other embodiments, the combustor may experience higher temperatures in some areas of the combustor than in other areas of the combustor, and in such embodiments, the seals 180 within the higher temperature areas may define purge apertures 186 while the seals 180 in other areas of the combustor do not define purge apertures 186, such that the purge flow through the seals 180 is provided only in limited areas of the combustor.

FIG. 9 provides a cross-sectional view of a seal 190 extending between adjacent heat shields 114 according to an exemplary embodiment of the present subject matter. The seal 190 has some differences from the above-described seals 140, 150, 160, 170, 180, but also utilizes some similar features. For example, as shown in FIG. 9, the seal 190 extends from an edge 115a of a first heat shield 114a to an edge 115b of a second heat shield 114b. However, unlike the other embodiments of seals described above, the seal 190 extends within a pocket defined in each heat shield edge 115. More specifically, the first heat shield 114a defines a first pocket 134a along its edge 115a, and the second heat shield 114b defines a second pocket 134b along its edge 115b. The first pocket 134a opens toward the second pocket 134b, and the seal 190 is positioned within the first and second pockets 134a, 134b such that the seal 190 extends from the edge 115a of the first heat shield 114a to the edge 115b of the second heat shield 114b within the pockets 134a, 134b and thereby spans a gap G between the first heat shield 114a and the second heat shield 114b. In particular, the seal 190 includes a first side 192a positioned within the first pocket 134a and a second side 192b positioned within the second pocket 134b. The seal 190 has a length (not shown) such that the first and second sides 192a, 192b extend along the length of the respective pocket 134a, 134b. It will be appreciated that, in embodiments of combustor assembly 79 comprising a plurality of heat shields 114, a plurality of seals 190 may be provided, e.g., each heat shield edge may define a pocket and a seal 190 may extend between the pockets of adjacent heat shield edges.

Further, as depicted in FIG. 9, the edges 115a, 115b of heat shields 114a, 114b are built up, i.e., the edges 115 are thicker than other portions of the heat shields 114. By building up the edges 115a, 115b, the edges have additional material for machining, e.g., such that the edges may be machined to increase the precision of the interface between the heat shields 114 and the seal 190. More particularly, the built up edges 115 provide an area in each heat shield 114 in which the pockets 134 can be defined. As further described herein, the heat shields 114 may be made from a CMC material, such that the edge build up of a heat shield 114 may comprise additional CMC plies that are feathered in with the CMC plies forming the heat shield 114 to provide machine stock for machining the pockets 134 in each heat shield 114. In other embodiments, the pockets 134 may be defined as the CMC plies are laid up rather than during post-processing machining of the CMC heat shields 114. The edges 115 and pockets 134 may be formed in other ways as well.

As further illustrated in FIG. 9, in some embodiments, the seal 190 defines a purge aperture 196 through the seal. Similar to the purge aperture 186 of seal 180, the purge aperture 196 may allow a flow F of cooling fluid from between the heat shields 114 and the combustor dome 100 to flow through the seal 190. The flow F of cooling fluid through the seal 190 helps cool the seal 190, as well as the heat shields 114 and combustor dome 100. It will be appreciated that a plurality of purge apertures 196 may be provided along the length of seal 190. Further, the purge apertures 196 may not be required for each embodiment of the seal 190. For example, in some embodiments, the engine temperatures may be low enough that purge flow through the seals 190 is not required. In other embodiments, the combustor may experience higher temperatures in some areas of the combustor than in other areas of the combustor, and in such embodiments, the seals 190 within the higher temperature areas may define purge apertures 196 while the seals 190 in other areas of the combustor do not define purge apertures 196, such that the purge flow through the seals 190 is provided only in limited areas of the combustor.

As previously described, the combustor dome 100 and heat shields 114 may be made from different materials. For instance, the combustor dome 100 may be made from a metallic material, such as a metal alloy, and the heat shields 114 may be made from a CMC material. As such, the components may have different coefficients of thermal expansion such that there is an alpha mismatch between the heat shields 114 and combustor dome 100. Generally, in such embodiments, the combustor dome 100 will thermally expand at lower temperatures than the CMC heat shields 114. In embodiments in which the heat shields 114 are attached to the combustor dome 100, e.g., as shown in FIG. 3, as the combustor dome thermally expands, adjacent heat shields 114 move away from one another, as indicated by the dashed lines in FIG. 9. That is, a gap $G_C$ may be defined between adjacent heat shield edges 115 before the combustion temperatures rise to a temperature at which the combustor dome 100 begins to expand. Once the combustor dome 100 begins to expand, the adjacent heat shield edges 115 begin to move farther apart, such that the gap increases to a gap $G_H$. Thus, the dashed lines in FIG. 9 generally represent a "cold" position of the heat shields 114, i.e., a position of the heat shields before the combustor dome 100 begins to thermally expand, while the solid lines represent a "hot" position of the heat shields 114, i.e., a position of the heat shields once the combustor dome 100 thermally expands. As shown in FIG. 9, the seal 190 has a width W sufficient to provide a seal between the heat shields 114 as the heat shields separate with the thermal expansion of the combustor dome 100.

Turning now to FIG. 10, a cross-sectional view is provided of adjacent heat shields 114 forming a seal 200 according to an exemplary embodiment of the present subject matter. The seal 200 is different from the above-described seals 140, 150, 160, 170, 180, 190 but also utilizes some similar features. For example, as shown in FIG. 10, the seal 200 is formed along an edge 115a of a first heat shield 114a and an edge 115b of a second heat shield 114b. However, unlike the other embodiments of seals described above, the seal 200 is not a separate component but, rather, is formed from the heat shields 114. More particularly, the first heat shield 114a includes a first overlap portion 136a along its edge 115a. Similarly, the second heat shield 114b includes a second overlap portion 136b along its edge 115b. Each overlap portion 136a, 136b defines an interface surface 138 along which the overlap portions 136 of the adjacent heat shields 114 interface. That is, as shown in FIG. 10, a first interface surface 138a of the first overlap portion 136a contacts or interfaces with a second interface surface 138b of the second overlap portion 136b. It will be appreciated that, in embodiments of combustor assembly 79 comprising a plurality of heat shields 114, each heat shield edge 115 may define an overlap portion 136 that overlaps with an overlap portion 136 defined by an adjacent heat shield edge 115 such that a plurality of seals 200 may be provided at the edges of the plurality of heat shields 114.

Further, as illustrated in FIG. 10, the edges 115a, 115b of the heat shields 114a, 114b are built up, i.e., thicker than other portions of the heat shields 114. By building up the edges 115a, 115b, the edges have additional material for machining, e.g., such that the edges may be machined to define the overlap portions 136 having the interface surfaces 138 without reducing the thickness of the body of the heat shield. As further described herein, the heat shields 114 may be made from a CMC material, such that the edge buildup of a heat shield 114 may comprise additional CMC plies that are feathered in with the CMC plies forming the heat shield 114 to provide machine stock for machining the interface between the first heat shield 114a and the second heat shield 114b, which forms the seal 200.

Keeping with FIG. 10, in some embodiments, the seal 200 defines a purge aperture 206 through the seal. Similar to the purge aperture 186 of seal 180 and purge aperture 196 of seal 190, the purge aperture 206 may allow a flow F of cooling fluid from between the heat shields 114 and the combustor dome 100 to flow through the seal 200. The flow F of cooling fluid through the seal 200 helps cool the heat shields 114 in the area of seal 200, as well as the combustor dome 100. It will be appreciated that a plurality of purge apertures 206 may be provided along the length of seal 200. Further, the purge apertures 206 may not be required for each embodiment of the seal 200. For example, in some embodiments, the engine temperatures may be low enough that purge flow through the seals 200 is not required. In other embodiments, the combustor may experience higher temperatures in some areas of the combustor than in other areas of the combustor, and in such embodiments, the seals 200 within the higher temperature areas may define purge apertures 206 while the seals 200 in other areas of the combustor do not define purge apertures 206, such that the purge flow through the seals 200 is provided only in limited areas of the combustor.

As described with respect to the embodiment of FIG. 9, the combustor dome 100 and heat shields 114 may be made from different materials having different coefficients of thermal expansion, e.g., the combustor dome 100 may be made from a metallic material, such as a metal alloy, and the heat shields 114 may be made from a CMC material. Generally, in such embodiments, the combustor dome 100 will thermally expand at lower temperatures than the CMC heat shields 114, and in embodiments in which the heat shields 114 are attached to the combustor dome 100, as the combustor dome thermally expands, adjacent heat shields 114 move away from one another, as indicated by the dashed lines in FIG. 10. That is, before the combustion temperatures rise to a temperature at which the combustor dome 100 begins to expand, a gap $G_C$ may be defined between a second end 137a of the first overlap portion 136a and a first end 135b of the second overlap portion 136b and between a second end 137b of the second overlap portion 136b and a first end 135a of the first overlap portion 136a. Once the combustor dome 100 begins to expand, the adjacent heat shield edges 115 begin to move farther apart, such that the gap increases to a gap $G_H$. Thus, the dashed lines in FIG. 10 generally represent a "cold" position of the heat shields 114, i.e., a position of the heat shields before the combustor dome 100 begins to thermally expand, while the solid lines represent a "hot" position of the heat shields 114, i.e., a position of the heat shields once the combustor dome 100 thermally expands. As shown in FIG. 10, the overlap portions 136 each have a width W sufficient to provide the seal 200 between the heat shields 114 as the heat shields separate with the thermal expansion of the combustor dome 100.

FIG. 11 provides a top, perspective view of a seal 210 according to another exemplary embodiment of the present subject matter. In the exemplary embodiment illustrated in FIG. 11, the seal 210 extends generally in the shape of a heat shield perimeter. That is, the seal 210 is a single piece seal that extends along all edges 115 of a first heat shield 114a. Additionally, the seal 210 extends between the edges 115 of the first heat shield 114a and each adjacent heat shield 114, e.g., from an edge 115 of the first heat shield 114a to an adjacent edge 115 of a second heat shield 114b positioned on one side of the first heat shield 114a and from an edge 115 of the first heat shield 114a to an adjacent edge 115 of a second heat shield 114b positioned on another side of the first heat shield 114a. It will be appreciated that the seal 210 may be configured similarly to any of the seals 140, 150, 160, 170, 180, 190, 200 described above. In one exemplary embodiment, the seal 210 is configured similarly to the plunger seal 150, where the plunger 156 is formed generally in the shape of the perimeter of a heat shield 114. In another exemplary embodiment, the seal 210 is configured similarly to the plunger seal 160, where the plunger 166 is formed generally in the shape of the perimeter of a heat shield 114 and the housing 162 is configured to accommodate the perimeter-shaped plunger 166. However, the seal 210 may have any suitable configuration.

Accordingly, in each of the seal embodiments described with respect to FIGS. 4 through 11, the heat shields 114 and combustor dome 100 may move with respect to one another due to different rates of thermal expansion. Each of the above-described seals may have one or more features for adjusting or adapting to the relative movement between the heat shields 114 and combustor dome 100 such that the gaps G between the heat shields 114 and combustor dome 100 remain sealed as the heat shields 114 and combustor dome 100 move. Further, it should be understood that, in embodiments of combustor assembly 79 comprising a plurality of seals, the plurality of seals may comprise a mixture or combination of any of the various seals described herein.

That is, each of the plurality of seals need not be of the same type, although each of the plurality of seals could be of the same type. Moreover, although each of the foregoing embodiments generally is described as including a single seal along a pair of adjacent heat shield edges 115, in other embodiments multiple seals may be provided along a pair of adjacent heat shield edges 115. For instance, two, three, or more seals may be provided along the length of adjacent first and second heat shield edges 115a, 115b. In still other embodiments, one seal may extend along a perimeter of a heat shield, as well as between adjacent heat shield edges 115. Other seal configurations may be used as well.

FIG. 12 provides a flow diagram illustrating a method 1200 for sealing between adjacent heat shields of a combustor assembly, according to an exemplary embodiment of the present subject matter. As previously described, the heat shields 114 may be made from a CMC material, which is a non-metallic material having high temperature capability. Accordingly, as shown at 1202 in FIG. 11, the method for sealing may include forming CMC heat shields. To form each CMC heat shield, a plurality of plies of a CMC material may be laid up to form a CMC component preform having a desired shape or contour, as shown at 1202a in FIG. 11. It will be appreciated that the plurality of CMC plies forming the preform may be laid up on a layup tool, mold, mandrel, or another appropriate device for supporting the plies and/or for defining the desired shape. The desired shape of CMC component preform may be a desired shape or contour of the resultant CMC component. As an example, the plies may be laid up to define a shape of CMC component preform that is the shape of heat shield 114, such as the first heat shield 114a and/or the second heat shield 114b illustrated in FIGS. 4 through 10. In some embodiments, laying up the plurality of plies may include stacking plies and/or feathering in plies to define built up edges 115 about a perimeter of the heat shield preform, e.g., such that the edge 115 comprises a stack of plies of the CMC material. Laying up the plurality of plies to form the heat shield preform may include defining other features of the heat shield 114 as well, such as the pockets 134 described with respect to FIG. 9 and/or the aperture 118 described with respect to FIG. 3.

After the plurality of plies is laid up, the plies may be processed, e.g., compacted and cured in an autoclave, as shown at 1202b in FIG. 12. After processing, the plies form a green state CMC component, e.g., a green state CMC heat shield 114. The green state CMC component is a single piece component, i.e., curing the plurality of plies joins the plies to produce a CMC component formed from a continuous piece of CMC material. The green state component then may undergo firing (or burn-off) and densification, illustrated at 1202c and 1202d in FIG. 12, to produce a final CMC component. In an exemplary embodiment of method 1200, the green state component is placed in a furnace with silicon to burn off any mandrel-forming materials and/or solvents used in forming the CMC plies, to decompose binders in the solvents, and to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Optionally, as shown at 1202e in FIG. 12, after firing and densification the CMC component may be finish machined, if and as needed, and/or coated with an environmental barrier coating (EBC). For example, as previously described, the edges 115 of the heat shield 114 may be machined to define an interface surface to interface with, e.g., a seal or the edge of an adjacent heat shield. As another example, machining the CMC component may comprise defining an overlap portion 136 in each edge 115 of each CMC heat shield 114. In some embodiments, the interface surfaces or other features may be machined into the green state heat shield 114, i.e., after the CMC preform is processed as shown at 1202b in FIG. 12 but before the CMC heat shield 114 undergoes firing and densification as shown at 1202c and 1202d in FIG. 12.

As shown at 1204 in FIG. 12, method 1200 also includes providing a seal that extends from one heat shield 114 to an adjacent heat shield 114 such that the seal spans a gap between the one heat shield and the adjacent heat shield. The seal may be one or more of seals 140, 150, 160, 170, 180, 190, 200, or 210 described in greater detail above. For instance, the seal may comprise overlapping edges 115 of the adjacent heat shields 114 as described with respect to seal 200 illustrated in FIG. 10. Other exemplary seals may be used as well, and each seal extends between one heat shield 114, an adjacent heat shield 114, and the combustor dome 100 to minimize combustion gas leakage between the heat shields 114 and combustor dome 100, as well as to minimize combustion gas impingement on the combustor dome 100.

Method 1200 is provided by way of example only. For example, other methods for forming CMC heat shields 114 may be used, e.g., utilizing other known methods or techniques for compacting and/or curing CMC plies, as well as for densifying the green state CMC component. Alternatively, any combinations of these or other known processes may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for sealing between adjacent heat shields in a combustor assembly, the combustor assembly comprising a combustor dome, a first heat shield having an edge, and an adjacent second heat shield having an edge, the method comprising:

providing a seal that extends from the edge of the first heat shield to the edge of the adjacent second heat shield such that the seal spans a gap between the first heat shield and the adjacent second heat shield, wherein each heat shield is formed from a ceramic matrix composite (CMC) material such that each heat shield is a CMC heat shield, wherein the seal comprises a plunger having a first leg and a second leg, the first leg received within a first groove defined in the combustor dome of the combustor assembly and the second leg received within a second groove defined in the combustor dome, the plunger positioned in contact with the first heat shield and the adjacent second heat shield.

2. The method of claim 1, further comprising forming each CMC heat shield, wherein forming each CMC heat shield comprises:
   laying up a plurality of plies of the CMC material;
   processing the plurality of plies to form a green state CMC heat shield;
   firing the green state CMC heat shield; and
   densifying the fired CMC heat shield to produce the CMC heat shield.

3. The method of claim 2, wherein laying up the plurality of plies of the CMC material comprises laying up additional plies along each edge of each CMC heat shield such that the edges of each CMC heat shield are built up to be thicker than a body of the CMC heat shield.

4. A combustor assembly for a gas turbine engine, comprising:
   a combustor dome defining a first groove and a second groove;
   a first heat shield having an edge;
   a second heat shield having an edge; and
   a seal extending from the edge of the first heat shield to the edge of the second heat shield such that the seal spans a gap between the first heat shield and the second heat shield, the seal comprising a plunger having a first leg received within the first groove and a second leg received within the second groove, the plunger positioned in contact with the first heat shield and the second heat shield.

5. The combustor assembly of claim 4, wherein the seal defines a plurality of openings to allow a flow of purge air therethrough.

6. The combustor assembly of claim 4, wherein the first heat shield defines an interface surface along the edge of the first heat shield and the second heat shield defines an interface surface along the edge of the second heat shield, and wherein a first portion of the seal is positioned against the interface surface of the first heat shield and a second portion of the seal is positioned against the interface surface of the second heat shield.

7. The combustor assembly of claim 4,
   further comprising:
   a channel defined between the plunger and the combustor dome;
   a spring positioned within the channel, the plunger positioned on the spring such that the spring urges the plunger into contact with the first and second heat shields.

8. A combustor assembly for a gas turbine engine, comprising:
   a combustor dome defining a first groove and a second groove;
   a first heat shield having an edge;
   a second heat shield having an edge; and
   a seal extending from the edge of the first heat shield to the edge of the second heat shield, the seal having a plunger comprising:
      a first contact portion contacting the edge of the first heat shield,
      a second contact portion contacting the edge of the second heat shield edge,
      a connecting portion connecting the first portion and the second portion,
      a first leg received within the first groove, and
      a second leg received within the second groove,
      wherein the first contact portion and the second contact portion project away from the connecting portion.

9. The combustor assembly of claim 8, wherein the plunger is formed in a shape of a heat shield perimeter.

10. The combustor assembly of claim 8, wherein the connecting portion is in contact with a spring.

* * * * *